United States Patent
Schmid et al.

(10) Patent No.: US 11,369,972 B2
(45) Date of Patent: Jun. 28, 2022

(54) PROCESSING SYSTEM

(71) Applicant: Kleemann GmbH, Göppingen (DE)

(72) Inventors: Wolfgang Schmid, Rechberghausen (DE); Christian Weller, Esslingen (DE); Otto Blessing, Bartholomä (DE)

(73) Assignee: Kleemann GmbH

( * ) Notice: Subject to any disclaimer, the term of this patent is extended or adjusted under 35 U.S.C. 154(b) by 420 days.

(21) Appl. No.: 16/615,256

(22) PCT Filed: Mar. 16, 2018

(86) PCT No.: PCT/EP2018/056699
§ 371 (c)(1),
(2) Date: Nov. 20, 2019

(87) PCT Pub. No.: WO2018/219513
PCT Pub. Date: Dec. 6, 2018

(65) Prior Publication Data
US 2020/0197949 A1 Jun. 25, 2020

(30) Foreign Application Priority Data
Jun. 1, 2017 (DE) ...................... 10 2017 112 091.2

(51) Int. Cl.
*B02C 21/02* (2006.01)
*B02C 23/02* (2006.01)
*B02C 23/08* (2006.01)

(52) U.S. Cl.
CPC ............ *B02C 21/026* (2013.01); *B02C 23/02* (2013.01); *B02C 23/08* (2013.01)

(58) Field of Classification Search
CPC ....... B02C 21/02; B02C 21/026; B02C 23/02; B02C 23/08; B02C 18/225; B02C 18/2241; B02C 2013/28645; B02C 2013/28636
See application file for complete search history.

(56) References Cited

U.S. PATENT DOCUMENTS

| 3,016,203 | A |   | 1/1962 | Sears et al. |
| 3,073,536 | A | * | 1/1963 | Quinn ...................... B02C 21/02 |
|           |   |   |        | 241/222 |

(Continued)

FOREIGN PATENT DOCUMENTS

| CA | 1042404 A1   | 11/1978 |
| CN | 201889289 U  | 7/2011  |
| EP | 2767340 A1   | 8/2014  |

OTHER PUBLICATIONS

International Search Report for PCT/EP2018/056699, dated Jun. 18, 2018, 12 pages (not prior art).

(Continued)

*Primary Examiner* — Faye Francis
(74) *Attorney, Agent, or Firm* — Lucian Wayne Beavers; Patterson Intellectual Property Law, PC

(57) ABSTRACT

The invention relates to a processing system, more particularly a stone crusher, with a filling unit (20), which can be filled with material to be crushed, wherein behind the filling unit (20) in the conveying direction or in the filling unit (20), a screening unit (30) is arranged, wherein the screening unit (30) can be vibrated by means of a vibration generator (38), wherein above the screening unit (30) a part of the supplied material is fed to a connected process unit, more particularly a crushing unit (40), and another part is separated out in the screening unit (30), and wherein the separated-out part of the material is fed by means of an adjustable flap of a conveying unit (70) in a bypass position optionally bypassing the connected process unit, more particularly the crushing unit (40), to a conveying device, more particularly a crusher discharge conveyor (60), or in a conveying position is conveyed out of the machine working area by means of a conveying device (50). To reliably and simply prevent the adjustable flap from becoming blocked by screen material, the invention proposes that the flap is attached to the (Continued)

Figure 1:
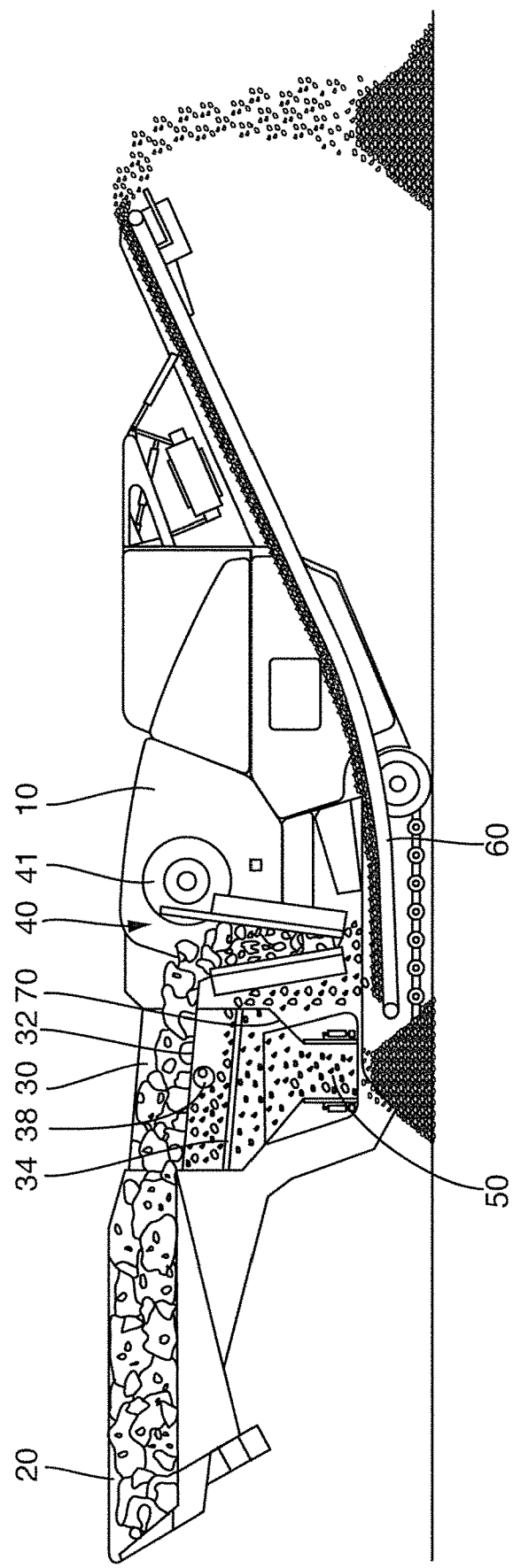

screening unit (30) in such a way that the vibration generator (38) excites it together with the screening unit (30).

18 Claims, 8 Drawing Sheets

(56) References Cited

U.S. PATENT DOCUMENTS

| | | | |
|---|---|---|---|
| 3,409,235 A | 11/1968 | Quinn | |
| 3,841,570 A | 10/1974 | Quinn | |
| 6,752,339 B2* | 6/2004 | Moriya | B02C 21/026 |
| | | | 241/101.74 |
| 8,469,298 B2* | 6/2013 | Robinson | B02C 2/007 |
| | | | 241/101.74 |
| 8,905,338 B2* | 12/2014 | Robinson | B02C 23/02 |
| | | | 241/34 |
| 9,186,681 B2* | 11/2015 | Cohen | B02C 21/026 |
| 10,137,457 B2* | 11/2018 | Robinson | B02C 23/02 |
| 2010/0193619 A1* | 8/2010 | Robinson | B02C 21/026 |
| | | | 241/245 |
| 2014/0224906 A1* | 8/2014 | Dunn | B02C 21/026 |
| | | | 209/241 |
| 2015/0076264 A1* | 3/2015 | Robinson | B02C 23/02 |
| | | | 29/428 |
| 2019/0083988 A1* | 3/2019 | Furrer | B02C 21/026 |

OTHER PUBLICATIONS

China Office Action from the corresponding patent application No. 201880026437.9, dated Dec. 21, 2020, 5 pages (not prior art).

\* cited by examiner

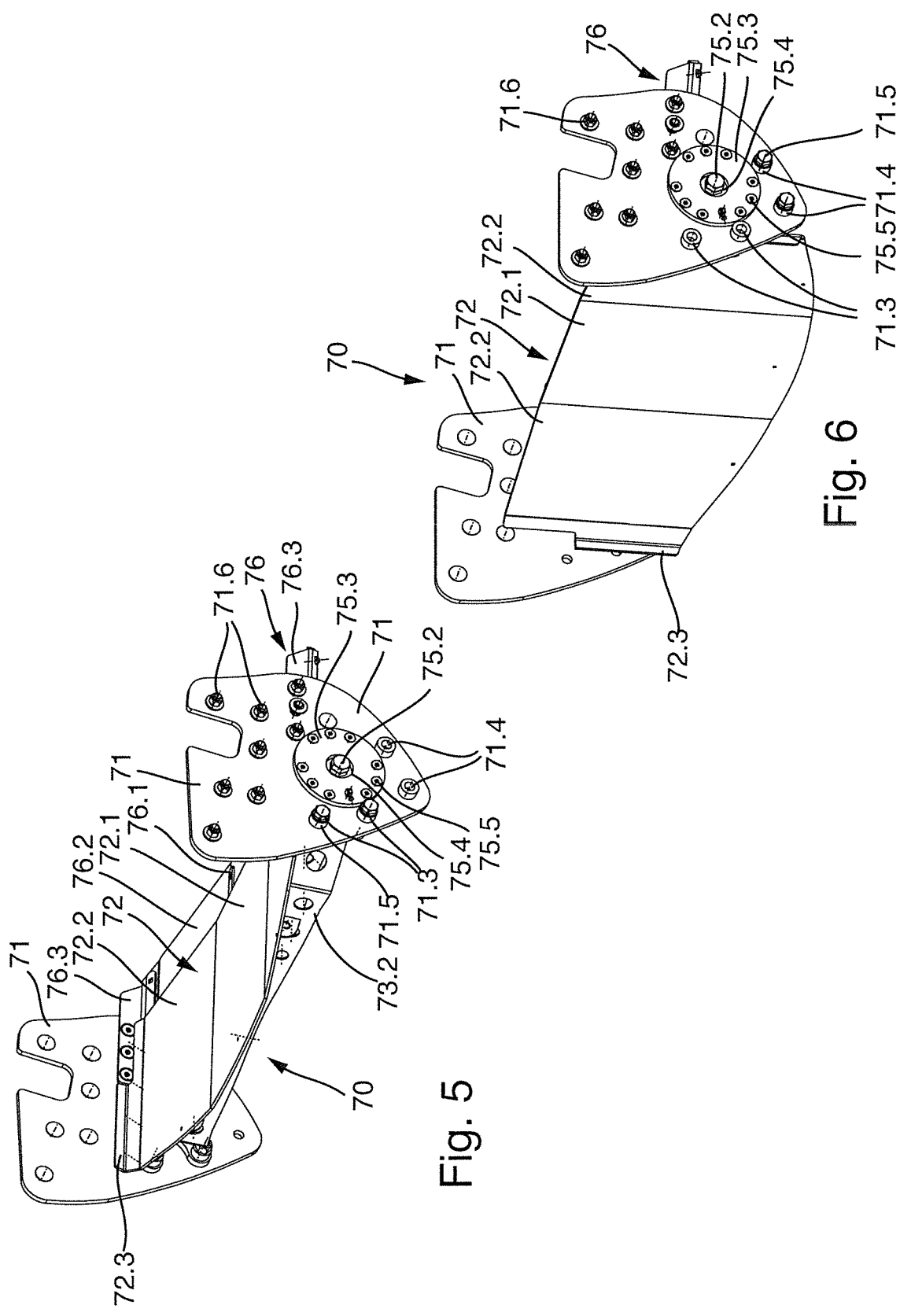

PROCESSING SYSTEM

The invention relates to a processing system, in particular a crushing system, more particularly a stone crusher, for processing natural stone and also for recycling demolition material, having a filling unit which can be filled with the material to be crushed, wherein a screening unit is arranged behind the filling unit in the conveying direction, wherein the screening unit can be made to vibrate by means of a vibration generator, and wherein a portion of the supplied material is fed to a crushing unit via the screening unit and a further portion is screened out in the screening unit, wherein the screened-out portion of the material, by means of an adjustable flap of a conveying unit, is either, in a bypass position, guided past the crushing unit to a crusher discharge conveyor or, in a conveying position, conveyed out of the working area of the machine by means of a conveying device.

Such crushing systems serve to comminute stones and are used either as mobile systems or as stationary systems. The material to be crushed is introduced into the system via the filling unit. Excavators are conventionally used for that purpose. Starting from the filling unit, the material to be comminuted is conveyed by means of a conveying device to the screening unit. The screening unit can have different constructions. Constructions are known in which the screening unit forms a simple conveyor trough which is provided with openings in order to achieve a screening action (grate-type trough). Also prior-known in the prior art are constructions in which a screen deck in the form of a circular or elliptical vibrator is used. In that case, one or more additional screens are installed beneath a conveyor trough. The stones are guided to a crushing unit via a conveying device. For example, the crushing unit can be a jaw crusher. As it is transported over the upstream unit (grate-type trough or screen), a portion of the supplied material is screened out; this screened-out fraction is guided past the crushing unit in the bypass, so that it does not block the crusher. It is then possible either to convey the screened-out partial fraction away via the crusher discharge conveyor, or there is the possibility of transporting it out of the working area of the machine via a separate conveying device. Side conveyors are conventionally used for this purpose. The user thus has the possibility of choosing whether to pursue one or the other mode of operation. For this purpose, he must set the adjustable flap of the conveying device either to the bypass position or to the conveying position.

During operation, it frequently occurs that the screened-out fine partial fraction sticks to the surface of the flap and increasingly blocks it. This then has the result that the screened-out material is no longer conveyed away in the desired manner but is distributed in an uncontrolled manner in the machine.

The object of the invention is, therefore, to provide a crushing system of the type mentioned at the beginning which is distinguished by improved operational reliability.

The object is achieved in that the flap is fastened to the screening unit in such a manner that it is excited by the vibration generator together with the screening unit.

Consequently, during operation, the flap vibrates together with the screening unit, so that the fine screenings are prevented from sticking to the surface of the flap. By means of this simple measure, operational reliability is consequently ensured and uncontrolled distribution of material in the machine is effectively prevented. In particular, it is ensured that, both in the bypass position and in the conveying position, the functionality of the flap is maintained.

According to a preferred variant of the invention, it can be provided that the adjustable conveying unit has two fastening portions spaced apart from one another, between which the flap is held in a pivotable manner, wherein the fastening portions are fastened to the screening unit. Secure and permanent fixing of the flap to the vibrating screening unit is thereby made possible. In order to reduce the outlay in terms of construction, it can in particular be provided that the fastening portions are fastened to opposite side walls of the screening unit. Preferably, the fastening portions of the conveying unit are fastened to the screening unit by means of flange portions, which are formed on the one hand on the opposite side walls of the screening unit and on the other hand on the fastening portions. Flange-mounting of the conveying unit allows the conveying unit to be fixed to the screening unit particularly quickly and easily. To that end, the flange portions are simply brought into contact relative to one another and fastened to one another. Any desired releasable fastening means, for example screws and nuts, can be used for fastening the flange portions to one another. The conveying unit flange-mounted on the screening unit can additionally be replaced particularly quickly and easily.

A conceivable alternative of the invention is that the fastening portions have bearing housings on which the flap is mounted with bearing portions, and the bearing portions are coupled to a profile portion which extends beneath the flap and is connected thereto. The profile portion defines a defined pivot axis and ensures that the bearing portions arranged on both sides of the flap are accurately positioned and associated.

In a preferred form of the invention, the flap has a middle region adjoined laterally on both sides, transversely to the conveying direction, by angled portions, and the screening unit has a conveyor trough which is formed by a non-rigid component, for example a rubber belt, on which the flap rests with its underside in the bypass position. The rubber belt may also be referred to as a flexible belt. With the non-rigid component, the conveyor trough can be shaped into a channel-like form in a very simple manner. The conveyor trough collects the material to be transported in the middle of the conveyor trough and guides it to the flap. With its middle region and its angled portions attached at the sides, the flap approximately reproduces the trough-shaped geometry of the non-rigid component and thus ensures that the screened-out material is definitely carried away. Because the flap in the bypass position rests with its underside on the conveyor trough, a descending step is formed in the conveying direction in the transition region between the conveyor trough and the flap, so that no resistance is presented to the transport path. Material is thus prevented in a very simple manner from sticking and blocking the flap.

If it is provided that the flap is underpinned by means of a carrying structure which is formed by longitudinal struts and transverse struts, a lightweight and stable construction is obtained.

A particularly preferred form of the invention provides that the adjustable conveying device has a conveying element behind the flap in the conveying direction, which conveying element adjoins the conveying region of the flap when the flap is in the bypass position. A space-saving construction is thereby achieved. In the bypass position, a sufficiently large transport distance can be bridged by the combination of the flap with the conveying element. The adjustment of the flap from the bypass position into the conveying position requires only a small pivot space. If it is additionally provided with this construction that the conveying element is fastened to the screening unit in such a manner that it is excited by the vibration generator together with the screening unit and the flap, then not only the flap, but also the conveying element is reliably prevented from becoming blocked with screened-out material. In order to reduce the outlay in terms of parts and mounting, it can also be provided that the conveying element is fastened to the two the fastening portions and holds them spaced apart from one another.

A crushing system according to the invention can also be in such a form that the conveying element has a conveying portion which is produced from a sheet-metal portion and which is underpinned on its underside by means of a carrying structure which comprises one or more support struts. By this measure too, a stable lightweight construction is achieved.

It is conceivable, in the case of the flap and/or the conveying element, to apply a material portion of a non-rigid material, for example rubber or plastics material, to the sheet-metal portion. The material portion can be mounted on sides running transversely to the conveying direction in the manner of a drum cover. Alternatively, it is also conceivable to dispense with the sheet-metal portion in the case of the flap and/or the conveying element, so that the material portion of the non-rigid material is underpinned directly by the carrying structure arranged beneath it. The material portion of the non-rigid material can be made to vibrate particularly well, so that blocking with screened-out material is effectively prevented. This is the case in particular when the material portion is mounted only at the sides.

In order to be able to hold the flap on the vibrating screening unit securely in the particular selected position, it can be provided that one or more locking portions having at least one locking receiver are coupled to the flap, which locking portions can be fixed to stationary fastening elements in the bypass position and/or the conveying position.

Figure 2:
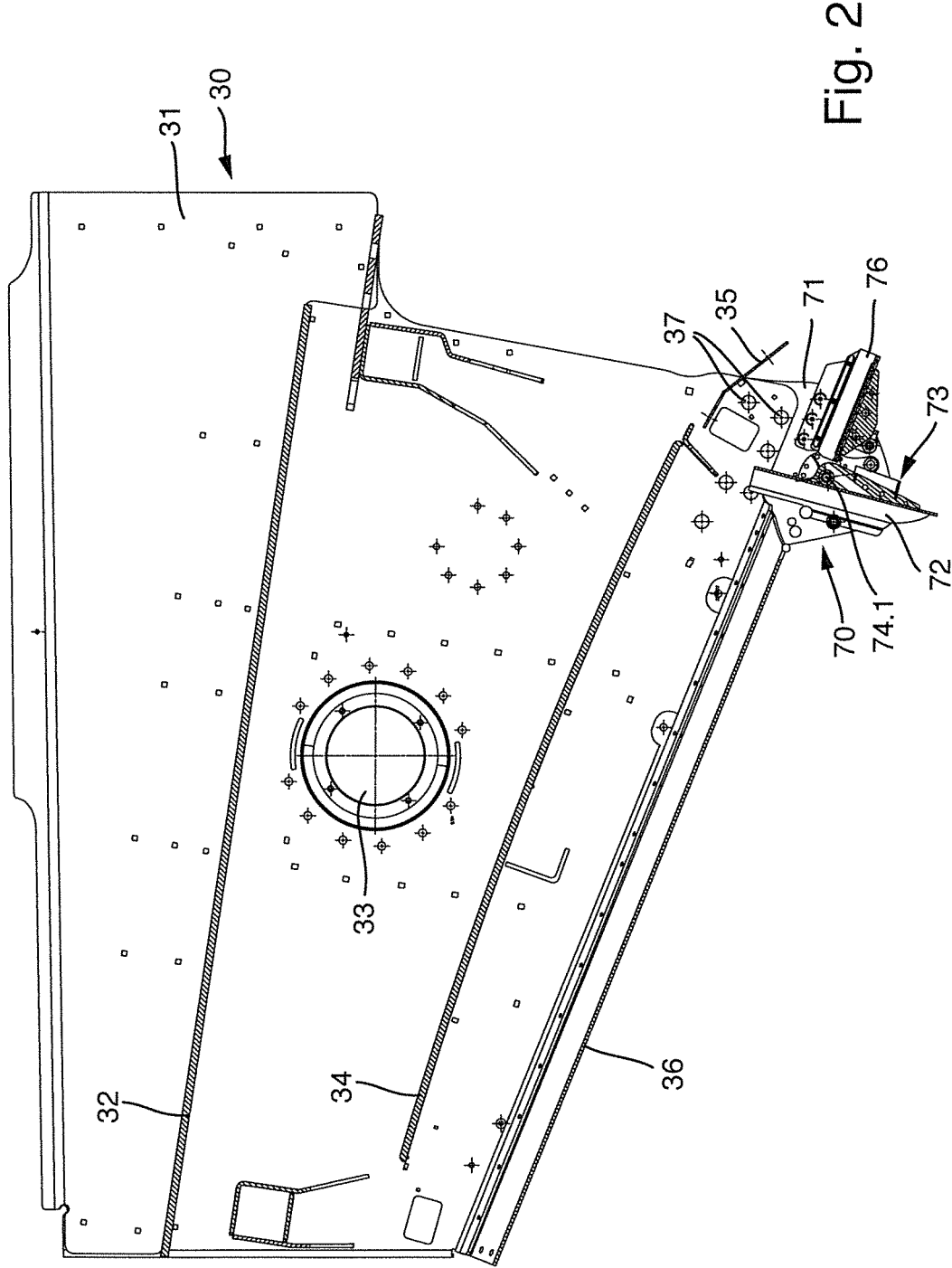
Figure 3:
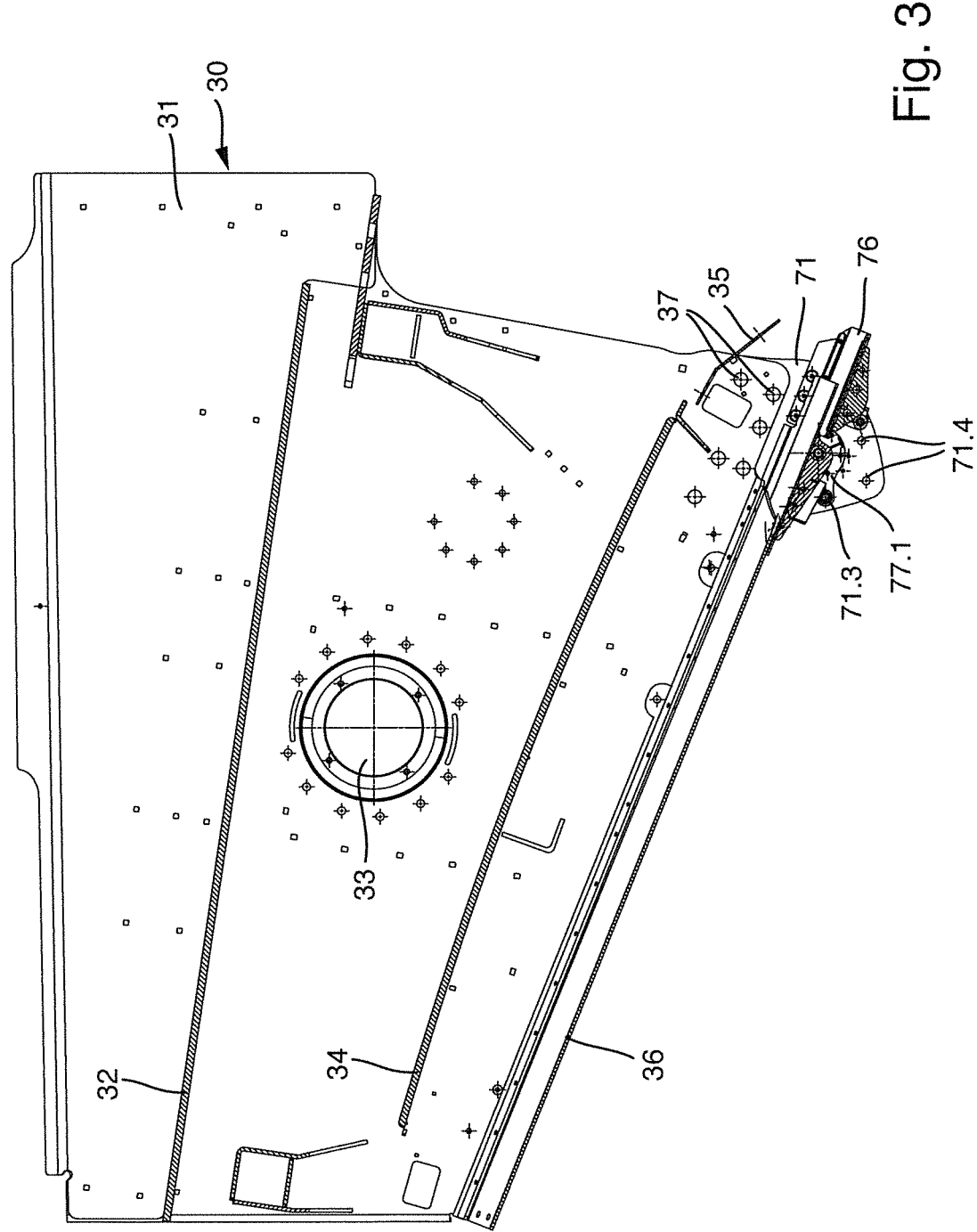
Figure 4:
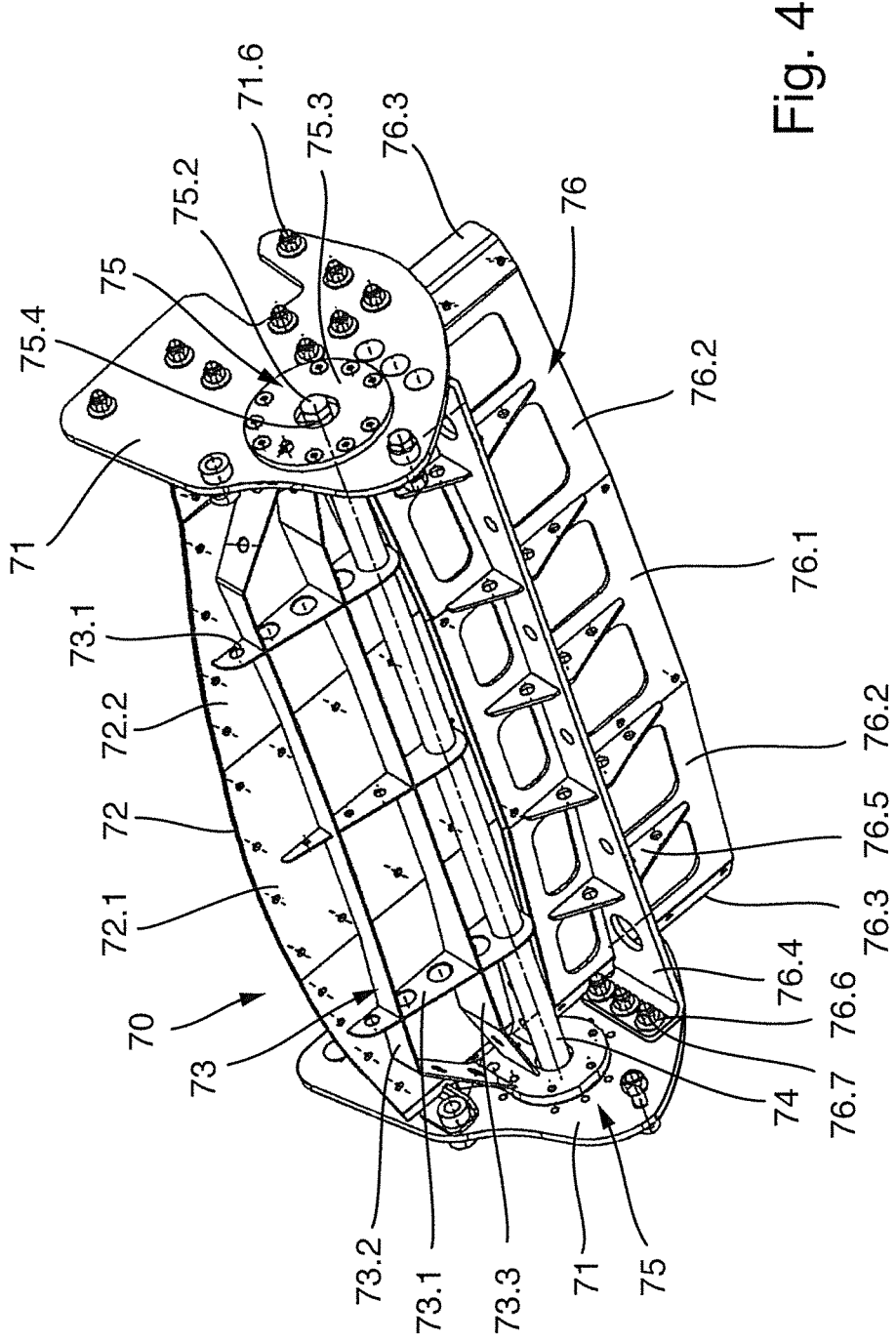
Figure 7:
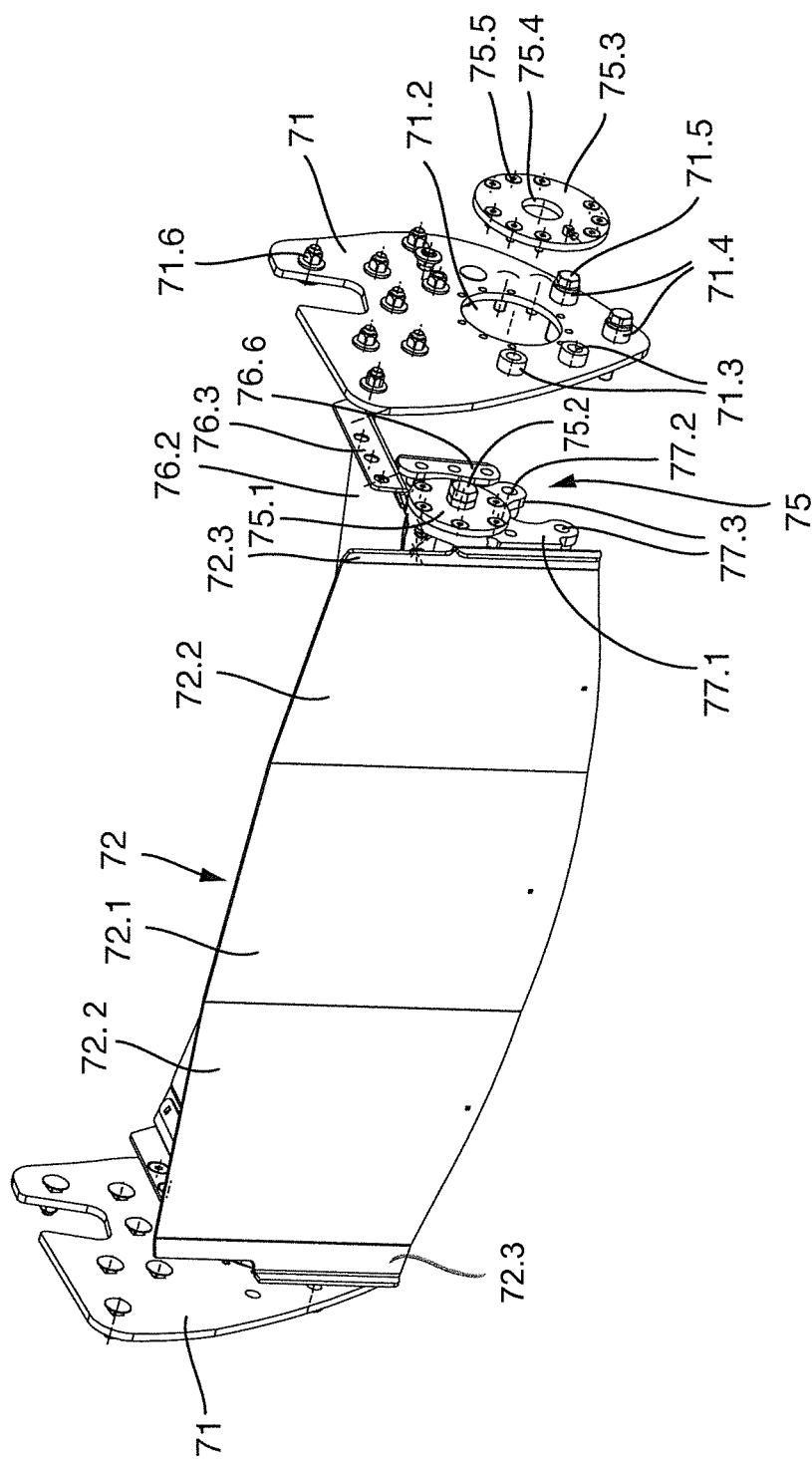
Figure 8:
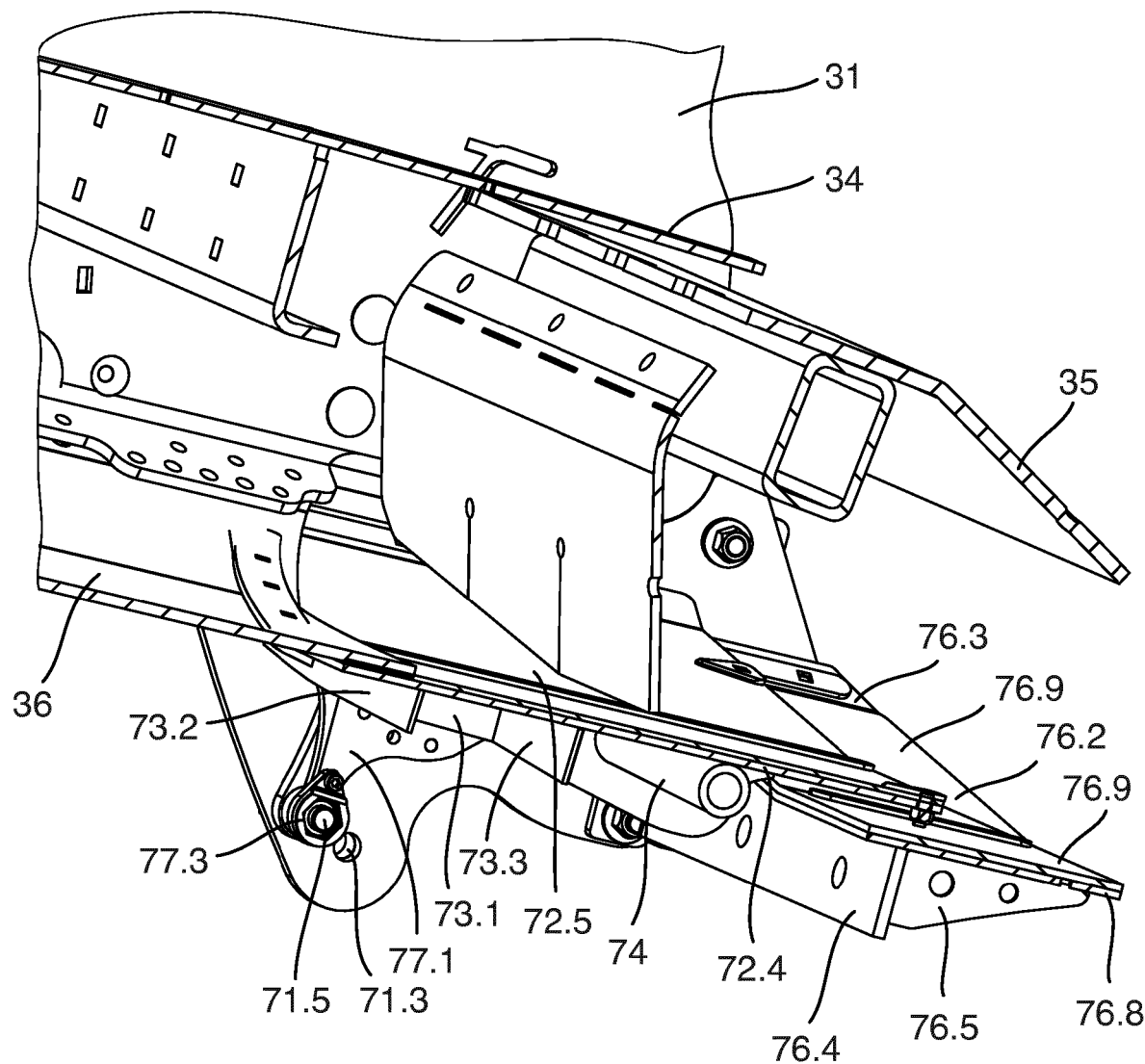
Figure 9:
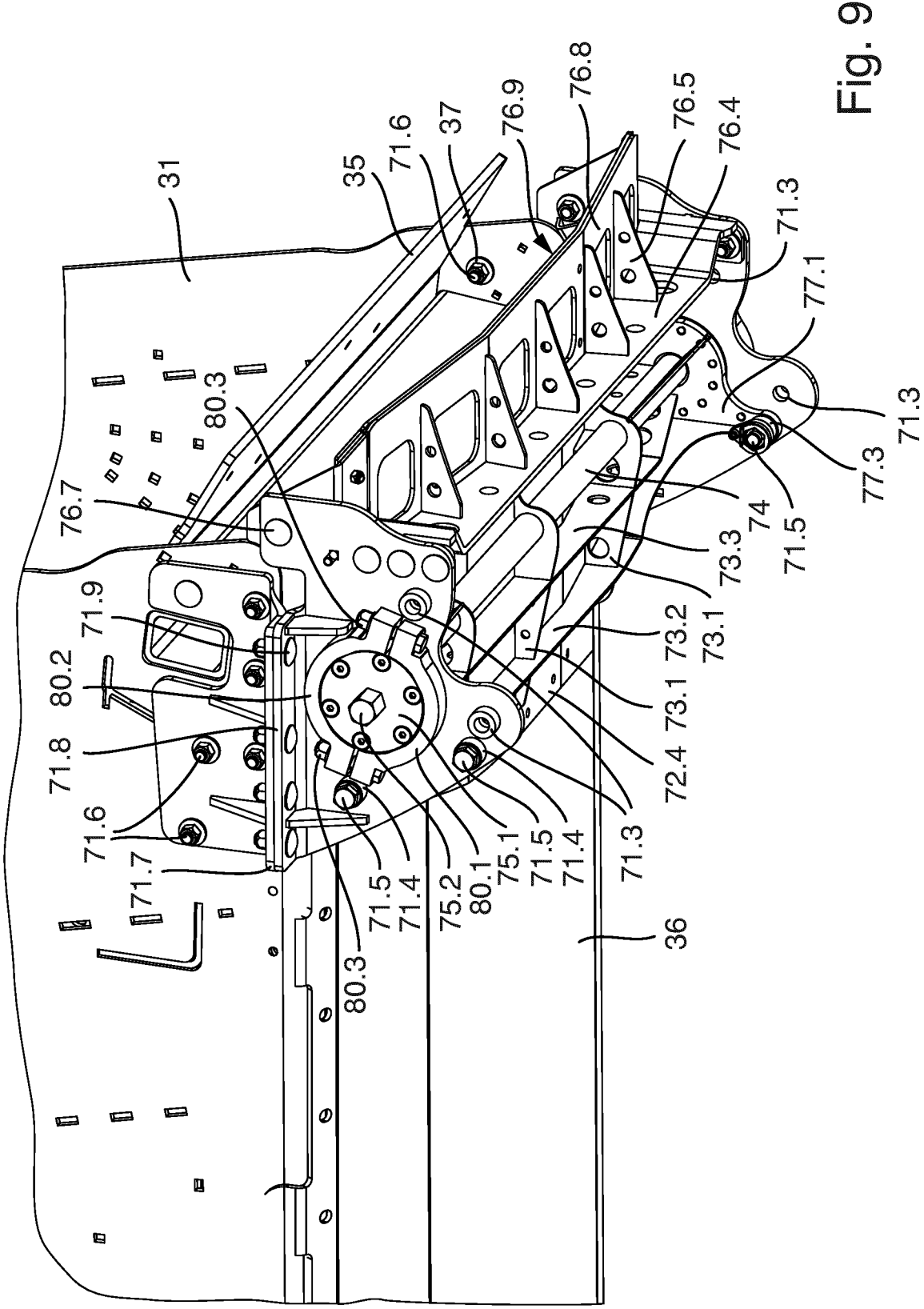

The invention will be explained in greater detail hereinbelow by means of an exemplary embodiments shown in the drawings, in which:

FIG. 1 shows, in a schematic representation, a mobile crushing system in a side view, FIG. 2 shows a screening unit of a crushing system in a side view and in section, FIG. 3 shows the representation according to FIG. 2 in a changed operating position, FIG. 4 shows an adjustable conveying unit in a perspective view from beneath, FIG. 5 shows the adjustable conveying unit according to FIG. 4 in a perspective side view, FIG. 6 shows the representation according to FIG. 5, but in a changed operating position, FIG. 7 shows the adjustable conveying unit according to FIGS. 4 to 6 in an exploded view, FIG. 8 shows a longitudinal section through an alternative embodiment of an adjustable conveying unit, and FIG. 9 shows a perspective view from beneath of an alternative embodiment of an adjustable conveying unit.

FIG. 1 shows a mobile crushing system 10 as is typically used for comminuting stones or other mineral material. This mobile crushing system 10 has a machine chassis which is carried by two running gears in the form of chain running gears.

The crushing system 10 is equipped with a filling unit 20, which is conventionally in the form of a funnel-shaped delivery unit. The crushing system 10 may also be referred to as a material crushing apparatus. The filling unit 20 may also be referred to as a hopper. Via this filling unit 20, the crushing system 10 can be filled with the material to be comminuted. The filling unit 20 has at the bottom a transport device, in particular a grate-type trough or, as in the present case, a conveyor belt. Via this conveying device, the material to be comminuted is fed to a screening unit 30. The screening unit 30 may also be referred to as a screen. The screening unit 30 has an associated vibration generator 38, which can be in the form of an eccentric drive. By means of this vibration generator 38, the screening unit 30 can be made to vibrate in order to subject the conveyed material to a screening process. The vibration generator 38 not only makes the screening unit 30 vibrate for screening purposes but, in conjunction with the sloping arrangement of the individual screen deck, a transporting action, as in the case of a vibratory conveyor, is also achieved.

As can be seen in FIG. 1, the coarse stone fraction, which is not screened out, is conveyed from the screening unit 30 to a crushing unit 40. This material which does not pass through the screen may be referred to as a first portion of the material. In the present case, the crushing unit 40 is in the form of a jaw crusher. This crushing unit 40 has two crushing jaws, which form a converging gap. The material to be comminuted is conveyed into the gap region. The crushing unit 40 has a fixed crushing jaw and a movable crushing jaw. The movable crushing jaw is driven by an eccentric drive 41. As can be seen in FIG. 1, the coarse stones are crushed in the converging gap. The crushed and comminuted stones leave the crushing unit 40 at the bottom and fall under the force of gravity onto a crusher discharge conveyor 60. In the present case, the crusher discharge conveyor 60 is in the form of a continuous revolving transport belt. Via the crusher discharge conveyor 60, the comminuted stones are carried away and piled up next to the crushing system 10. As can be seen in the drawing, the material coming from the filling unit 20 is guided in the screening unit 30 over a screen 32 (e.g. top screen deck). A portion of the stones is thereby screened out. This portion is stone portions which, on account of their size, do not have to be sent through the crushing unit 40 because they are already of a size that corresponds approximately to the stone size crushed by the crushing unit 40. This portion of the material which does pass through the screen may be referred to as a second portion of the material. As can be seen in the drawing, a portion of this screened-out stone fraction is delivered directly to the crusher discharge conveyor 60, namely in the bypass past the crushing unit 40. Beneath the screen 32 there is a further screen deck 34 in the screening unit 30. This screen deck 34 screens a further, fine partial fraction from the material which has already been screened out. It is in some cases desirable to separate this particularly fine partial fraction, for which purpose a take-off belt 50 is used. The fine partial fraction is delivered onto this continuously revolving take-off belt 50, conveyed out of the working area of the crushing system 10 and piled up, as can be seen in FIG. 1. However, it is not always desirable to discharge the fine partial fraction. Instead, the machine operator may wish to choose whether he would like to separate it or deliver it directly onto the crusher discharge conveyor 60 together with the screened-out coarser material. An adjustable conveying unit 70 is used for this purpose.

The construction, arrangement and functioning of the conveying unit 70 will be described in greater detail hereinbelow. As can be seen in FIG. 2, the screening unit 30 has two side walls 31, which are arranged spaced apart from one another.

Between the two side walls 31, the conveying region for the stones is formed. The representation shows that at least one of the side walls 31 has a housing 33 for the vibration generator 38. The vibration energy of the vibration generator 38 can thus be introduced into the side wall 31. A different arrangement of the vibration generator 38 is also conceivable, wherein it is to be provided, however, that the vibration energy is introduced from the vibration generator 38 into the screening unit 30 so that the screening unit 30 vibrates with the frequency and amplitude of the vibration generator 38. The screen 32 is held between the two side walls 31 in the upper region of the screening unit 30. The screen deck 34 is arranged beneath the screen 32. Between the screen 32 and the screen deck 34 there is a conveying region. A conveying region is delimited above the screen 32 by means of the two side walls and the screen 32. Beneath the screen deck 34 there is a further conveying region. This conveying region is delimited at the bottom by a conveyor trough 36. The conveyor trough 36 can be in the form of a non-rigid component, wherein the conveyor trough 36 extends in its longitudinal extent from the left-hand side of the screening unit 30 to the adjustable conveying unit 70. As can further be seen in the representation according to FIG. 2, the screen deck 34 can be lengthened by means of a deflecting surface 35. The deflecting surface 35 adjoins the screen deck 34 in the conveying direction in the form of a descending step, so that no barrier is formed in the conveying direction.

The adjustable conveying unit 70 has a flap 72 and a conveying element 76. The flap 72 can be pivoted about a pivot axis 74.1. In FIG. 2, an operating position is shown in which the flap 72 is in a pivoted conveying position. In that position, the fine partial fraction screened out by the screen deck 34 is delivered onto the take-off belt 50 by means of the flap 72. FIG. 3 shows a further operating position of the flap 72. This represents the bypass position. In this position, the screened-out fine stones coming from the conveyor trough 36 are guided via the flap 72 onto the conveying element 76. From the conveying element 76, the fine stones then fall onto the crusher discharge conveyor 60.

As can further be seen in FIGS. 2 and 3, the side walls 31 have screw receivers 37 in the region of the adjustable conveying unit 70. The screw receivers serve for fastening the adjustable conveying unit to the side walls 31. The adjustable conveying unit 70 can thus be fastened to the screening unit 30.

The construction of the adjustable conveying unit 70 can clearly be seen in the representations according to FIGS. 4 to 7. As these drawings show, the adjustable conveying unit 70 has two fastening portions 71, which can be in the form of sheet-metal portions. The fastening portions 71 may also be referred to as fastening brackets. Both the flap 72 and the conveying element 76 are arranged between the two fastening portions 71. The flap 72 is formed from a sheet-metal portion as a stamped and bent part. It has a middle region 72.1 adjoined on both sides by angled portions 72.2. Remote from the middle region 72.1, the angled portions 72.2 have bent portions 72.3. The trough-shaped geometry of the conveyor trough 36 is reproduced by the angled portions 72.2 positioned at the sides and the middle region 72.1. Beneath the flap 72 there is arranged a carrying structure 73. This carrying structure 73 has longitudinal struts 73.1 and transverse struts 73.2, 73.3, which are connected together. The longitudinal struts 73.1 and the transverse struts 73.2, 73.3 may all be referred to as reinforcement struts. The flap 72 is underpinned by the carrying structure 73, so that a stable lightweight construction is achieved. The longitudinal struts 73.1 can have openings through which a profile portion 74 is guided. The profile portion 74 can be fixed, for example welded, to the longitudinal struts 73.1. The profile portion 74 forms with its central longitudinal axis the pivot axis and 74.1. The profile portion 74 may also be referred to as a pivot shaft. Bearing portions 75.1 of a bearing 75 are fitted to the longitudinal ends of the profile portion 74, as can be seen in FIG. 7. The bearing portions 75.1 can, as shown, be formed by circular plates. The bearing portions 75.1 are welded to the ends of the profile portion 74 or otherwise fixed thereto in a rotationally fixed manner. Locking portions 77.1, 77.2 with locking receiver 77.3 can be fastened either to the bearing portions 75.1 or the carrying structure 30 or the flap 72. The locking portions 77.1, 77.2 are connected to the flap 72 in a rotationally fixed manner.

The association of the bearing portions 75.1 with the fastening portions 71 takes place via bearing housings 71.2, which, for example, as in the present case, are cut out of the fastening portions 71 in the form of circular cutouts. The bearing portions 75.1 can be inserted into the bearing housings 71.2 to form a pivot bearing. In order to prevent axial displacement of the flap 72 relative to the fastening portions 71, covers 75.3 are used. These covers 75.3 have fastening receivers, for example in the form of screw receivers. Fastening screws can be guided through the screw receivers and screwed into aligned threaded receivers of the fastening portion 71. As can be seen in FIG. 7, the cover 75.3 has an opening 75.4. The opening 75.4 provides access to an actuating element 75.2, which is connected to the bearing portion 75.1 in a rotationally fixed manner. The actuating element 75.2 can be formed, for example, by a hexagonal bolt. The actuating element 75.2 can be accessed through the opening 75.4 by means of a tool. The actuating element 75.2, and with it the flap 72, can be adjusted by means of the tool, in order to pivot the flap between the bypass position and the conveying position.

The conveying element 76 is also fixed to the two fastening portions 71. The conveying element 76 is again produced from a sheet-metal portion as a stamped and bent part. It has a middle region 76.1 adjoined at the sides by angled portions 76.2. Remote from the middle region 76.1, bent portions 76.3 are bent from the angled portions 76.2. The bent portions 76.3 have fastening receivers, as can be seen in FIG. 7. Via suitable fastening elements, for example screws, the conveying element 76 can then be connected to the fastening portions 71. The two fastening portions 71 are consequently fixed to the conveying element 76 with the desired distance. With the middle region 76.1 and the two angled portions 76.2, the conveying element 76 reproduces the trough-shaped geometry of the flap 72.

The construction of the conveying element 76 is illustrated further in FIG. 4. As is shown in this representation, support struts 76.4 and longitudinal struts 76.5 are fastened to the underside of the conveying element 76. These struts ensure a stable lightweight construction for the conveying element 76. The support struts 76.4 and the longitudinal struts 76.5 may all be referred to as reinforcement struts. The support strut 76.4 has angled fastening portions 76.6 at its longitudinal ends. Screws 76.7 can be inserted through these fastening receivers 76.6 in order to connect the support strut 76.4 to the fastening portions 71. Accordingly, the support strut 76.4 then serves on the one hand to stably underpin the conveying element 76 and on the other hand also to hold the fastening portions 71 at the defined distance from one another. The adjustable conveying unit 70 shown in FIGS. 4 to 7 with its flap 72 and the conveying element 76 can be manufactured as a pre-assembled component. It can then be mounted on the screening unit 30 in a simple manner. Mounting is simple if it is provided that the two fastening portions 71 are connected to the side walls 31 of the screening unit 30. For this purpose, it can be provided that the fastening portions 71 have screw receivers. These can be aligned with screw receivers of the side walls 31. By means of fastening screws 71.6, which are then guided through the screw receivers, a secure and stable association of the adjustable conveying unit 70 with the screening unit 30 can be achieved.

FIG. 8 shows an alternative embodiment of an adjustable conveying unit 70. In this case, a material portion 72.5 or 76.9 of non-rigid material, for example rubber or plastics material, is mounted on sheet-metal portions 72.4 or 76.8 of the flap 72 or of the conveying element 76, respectively. It is proposed in particular that the material portion 72.5 or 76.9 is mounted laterally (for example in the region of the bent portions 72.3 or 76.3) transversely to the conveying direction in the manner of a drum cover. The material portion 72.5 or 76.9 is thus underpinned by the sheet-metal portion 72.4 or 76.8 of the flap 72 or of the conveying element 76, respectively. Alternatively, it is also possible to dispense with the sheet-metal portions 72.4 or 76.8, so that the material portion 72.5 or 76.9 rests directly on the carrying structure 73; 73.1, 73.2, 73.3 or 76.4, 76.5 and is underpinned thereby. The material portion 72.5 or 76.9 of non-rigid material can be made to vibrate particularly well during operation of the crushing system 10, in order effectively to be able to prevent conveyed material from sticking to the flap 72 and/or the conveying element 76. Stiffening struts can be mounted in the material portion 72.5 or 76.9 of non-rigid material or on the material portion 72.5; 76.9, in order to hold the flap 72 or the conveying element 76 in a shape corresponding to the trough-shaped geometry of the conveyor trough 36 despite the non-rigid properties of the material portion.

In the embodiment of FIG. 9, the adjustable conveying unit 70 is flange-mounted on the screening unit 30. For this purpose, the side walls 31 of the screening unit 30 have associated first flange portions 71.7, and the fastening portions 71 of the conveying unit 70 have associated second flange portions 71.8. The flange portions may also be referred to as flanges. The first flange portions 71.7 are fixed to the side walls 31 of the screening unit by means of fastening screws 71.6. The second flange portions 71.8 are part of the fastening portions 71 or are welded thereto. Flange-mounting of the conveying unit 70 allows the conveying unit 70 to be fastened particularly quickly and easily to the screening unit 30. To that end, the flange portions 71.7, 71.8 are simply brought into contact relative to one another and fastened to one another. For fastening the flange portions 71.7, 71.8 to one another, any desired releasable fastening means can be used, for example screws 71.9 and nuts. The conveying unit 70 flange-mounted on the screening unit 30 can additionally be replaced particularly quickly and easily.

The functioning of the adjustable conveying unit will now be explained in greater detail hereinbelow. FIG. 3 shows the bypass position, as has been explained in greater detail above. In that position, the flap 72 rests with its upper side on the underside of the conveyor trough 36. Owing to the angled geometry of the flap 72, the flap 72 reproduces the bent shape of the conveyor trough 36. In this manner, trouble-free material transport is made possible. This is also assisted in that the flap 72 rests on the underside of the conveyor trough 36. In this manner, a descending step is formed in the conveying direction.

In the bypass position, the end of the flap 72 remote from the conveyor trough 36 is positioned above the conveying element 76, as can be seen in FIG. 3. A descending step in the conveying direction is also formed thereby, so that no blockages can occur. If the flap 72 is then to be rotated from the bypass position shown in FIG. 3 into the conveying position, a suitable tool is brought into engagement with the actuating element 75.2. The flap 72 can then be rotated until it reaches the position shown in FIGS. 2 and 6. The conveying path between the conveyor trough 36 and the conveying element 76 is then interrupted. The flow of material coming from the conveyor trough 36 is then guided directly onto the take-off belt 50. The flap 72 blocks the path between the conveyor trough 36 and the conveying element 76 and for this purpose also protrudes upwards slightly beyond those components. In this manner, material is reliably prevented from being able to enter the region of the crusher discharge conveyor 60.

In order to prevent undesirable adjustment of the flap 72 in the particular selected position, positioning elements 71.5 are used. These positioning elements 71.5 can be brought into engagement with the locking receivers 77.3 in the particular selected position. Particularly preferably, it can be provided that the positioning elements 71.5 are in the form of fastening screws, which are inserted through screw receivers 71.3, 71.4 of the fastening portions 71 and into the locking receivers 77.3 in the form of threaded receivers. This type of fastening has been found to be particularly suitable owing to the considerable vibrations of the screening unit 30. In particular, it can be provided to that end that, per adjustment position, one or more, preferably two, positioning elements 71.5 secure the association of the flap 72 with the fastening portions 71.

The invention claimed is:

1. A material crusher apparatus, comprising:
    a hopper for receiving material to be crushed;
    a screen configured to receive the material from the hopper and to separate the material into a first portion and a second portion;
    a vibration generator configured to vibrate the screen;
    a crusher configured to receive the first portion of material from the screen;
    a crusher discharge conveyor configured to receive crushed material from the crusher;
    a take-off conveyor; and
    an adjustable flap fastened to the screen such that the adjustable flap is vibrated by the vibration generator together with the screen, the adjustable flap being adjustable between a bypass position wherein the second portion of the material is guided past the crusher to the crusher discharge conveyor, and a conveying position wherein the second portion of the material is directed to the take-off conveyor.

2. The material crusher apparatus of claim 1, further comprising:
    two fastening brackets spaced apart from each other and fastened to the screen; and
    wherein the adjustable flap is pivotably held between the two fastening brackets.

3. The material crusher apparatus of claim 2, wherein:
    the screen includes two opposite side walls; and
    the two fastening brackets are fastened to the two opposite side walls of the screen.

4. The material crusher apparatus of claim 3, wherein:
    the two opposite side walls and the two fastening brackets each include flanges and the flanges of the two fastening brackets are fastened to the flanges of the two opposite side walls.

5. The material crusher apparatus of claim 2, wherein:
    the adjustable flap includes a pivot shaft and two bearings attached to the pivot shaft; and the two fastening brackets include bearing housings in which the two bearings are received.

6. The material crusher apparatus of claim 1, wherein:
the screen includes a conveyor trough formed by a flexible belt; and
the adjustable flap includes a middle region adjoined laterally on both sides by angled portions, and an underside of the adjustable flap rests on the flexible belt when the adjustable flap is in the bypass position.

7. The material crusher apparatus of claim 1, wherein:
the adjustable flap includes a plurality of longitudinal reinforcement struts and transverse reinforcement struts.

8. The material crusher apparatus of claim 1, further comprising:
a conveying element located downstream of the adjustable flap in a conveying direction; and
wherein the adjustable flap includes a conveying region configured to adjoin the conveying element when the adjustable flap is in the bypass position.

9. The material crusher apparatus of claim 8, wherein:
the conveying element is fastened to the screen such that the conveying element is vibrated by the vibration generator together with the screen and the adjustable flap.

10. The material crusher apparatus of claim 9, further comprising:
two fastening brackets spaced apart from each other and fastened to the screen;
wherein the adjustable flap is pivotably held between the two fastening brackets; and
wherein the conveying element is fastened to the two fastening brackets and holds the two fastening brackets spaced apart from each other.

11. The material crusher apparatus of claim 8, wherein:
the conveying element includes a conveying portion formed of sheet-metal, and a plurality of reinforcement struts attached to an underside of the conveying portion.

12. The material crusher apparatus of claim 11, wherein:
the adjustable flap includes a sheet-metal flap portion and a plurality of reinforcement struts attached to an underside of the sheet-metal flap portion.

13. The material crusher apparatus of claim 8, wherein:
the conveying element includes a conveying portion formed of non-rigid material, and a carrying structure including plurality of struts supporting an underside of the non-rigid material.

14. The material crusher apparatus of claim 8, wherein:
the conveying element includes a conveying portion formed of sheet-metal, and a layer of non-rigid material underpinned by the sheet-metal conveying portion.

15. The material crusher apparatus of claim 1, wherein:
the adjustable flap includes a sheet-metal flap portion and a plurality of reinforcement struts attached to an underside of the sheet-metal flap portion.

16. The material crusher apparatus of claim 1, wherein:
the adjustable flap includes a non-rigid flap portion and a carrying structure including plurality of struts supporting an underside of the non-rigid flap portion.

17. The material crusher apparatus of claim 1, wherein:
the adjustable flap includes a sheet-metal flap portion, and a layer of non-rigid material underpinned by the sheet-metal flap portion.

18. The material crusher apparatus of claim 1, further comprising:
two fastening brackets spaced apart from each other and fastened to the screen,
the adjustable flap being pivotably held between the two fastening brackets; and
at least one locking portion coupled to the adjustable flap and configured to be fixed to at least one of the two fastening brackets to selectively fix the adjustable flap in either the bypass position or the conveying position.

\* \* \* \* \*